(12) United States Patent
Shofman et al.

(10) Patent No.: US 11,493,383 B2
(45) Date of Patent: Nov. 8, 2022

(54) MAGNETIC PHOTOMULTIPLIER TUBE SYSTEM

(71) Applicant: EL-MUL TECHNOLOGIES LTD., Rehovot (IL)

(72) Inventors: Semyon Shofman, Kiryat Ekron (IL); Alexander Kadyshevitch, Tel Aviv (IL)

(73) Assignee: .EL-MUL TECHNOLOGIES LTD, Rehovot (IL)

( * ) Notice: Subject to any disclaimer, the term of this patent is extended or adjusted under 35 U.S.C. 154(b) by 349 days.

(21) Appl. No.: 16/792,263

(22) Filed: Feb. 16, 2020

(65) Prior Publication Data

US 2020/0264042 A1    Aug. 20, 2020

Related U.S. Application Data

(60) Provisional application No. 62/806,838, filed on Feb. 17, 2019.

(51) Int. Cl.
| | |
|---|---|
| *G01J 1/44* | (2006.01) |
| *H01J 43/14* | (2006.01) |
| *H01J 49/02* | (2006.01) |
| *H01J 43/18* | (2006.01) |

(52) U.S. Cl.
CPC ............ *G01J 1/44* (2013.01); *H01J 43/14* (2013.01); *H01J 43/18* (2013.01); *H01J 49/025* (2013.01); *G01J 2001/4453* (2013.01)

(58) Field of Classification Search
CPC ..... G01J 2001/4453; H01J 41/14; H01J 43/14
See application file for complete search history.

(56) References Cited

U.S. PATENT DOCUMENTS

| | | | |
|---|---|---|---|
| 4,359,706 A | 11/1982 | Flack | |
| 6,201,257 B1 * | 3/2001 | Stettner | B82Y 10/00 257/466 |
| 7,180,060 B2 | 2/2007 | Chefetz et al. | |
| 2011/0095177 A1 | 4/2011 | Giannakopulos et al. | |
| 2015/0001400 A1 * | 1/2015 | Caruba | G01R 33/0076 250/362 |
| 2015/0262806 A1 | 9/2015 | Shimomura | |

FOREIGN PATENT DOCUMENTS

WO    2006120005    11/2006

OTHER PUBLICATIONS

Abele at. al. , "Methodology of pole piece design in permanent magnets". Journal of Applied Physics 99, 08D903 (2006).

* cited by examiner

*Primary Examiner* — Joseph L Williams

(57) ABSTRACT

A magnetic photomultiplier tube (PMT) system, including a PMT. The PMT including a photocathode for converting an impinging photon to a photoelectron, an anode, and at least two or a series of oppositely facing pairs of dynodes, wherein each pair is spaced apart from an adjacent pair, a first electric field being generated intermediate at least one pair of oppositely facing dynodes and a second electric field generated intermediate at least one adjacent pairs of dynodes. The PMT system includes a magnetic field generated by a magnetic system, the PMT being positioned within the magnetic field.

20 Claims, 11 Drawing Sheets

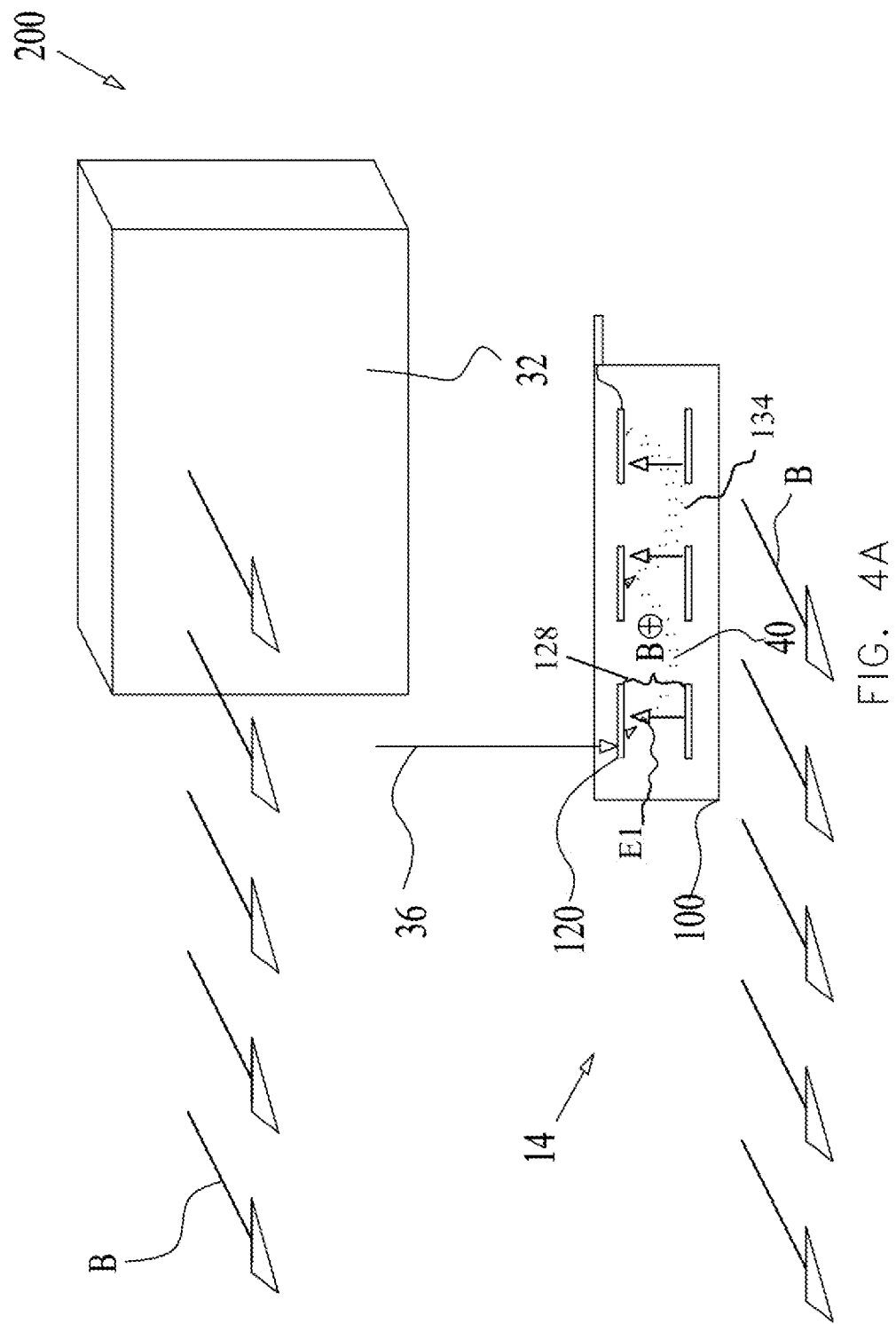

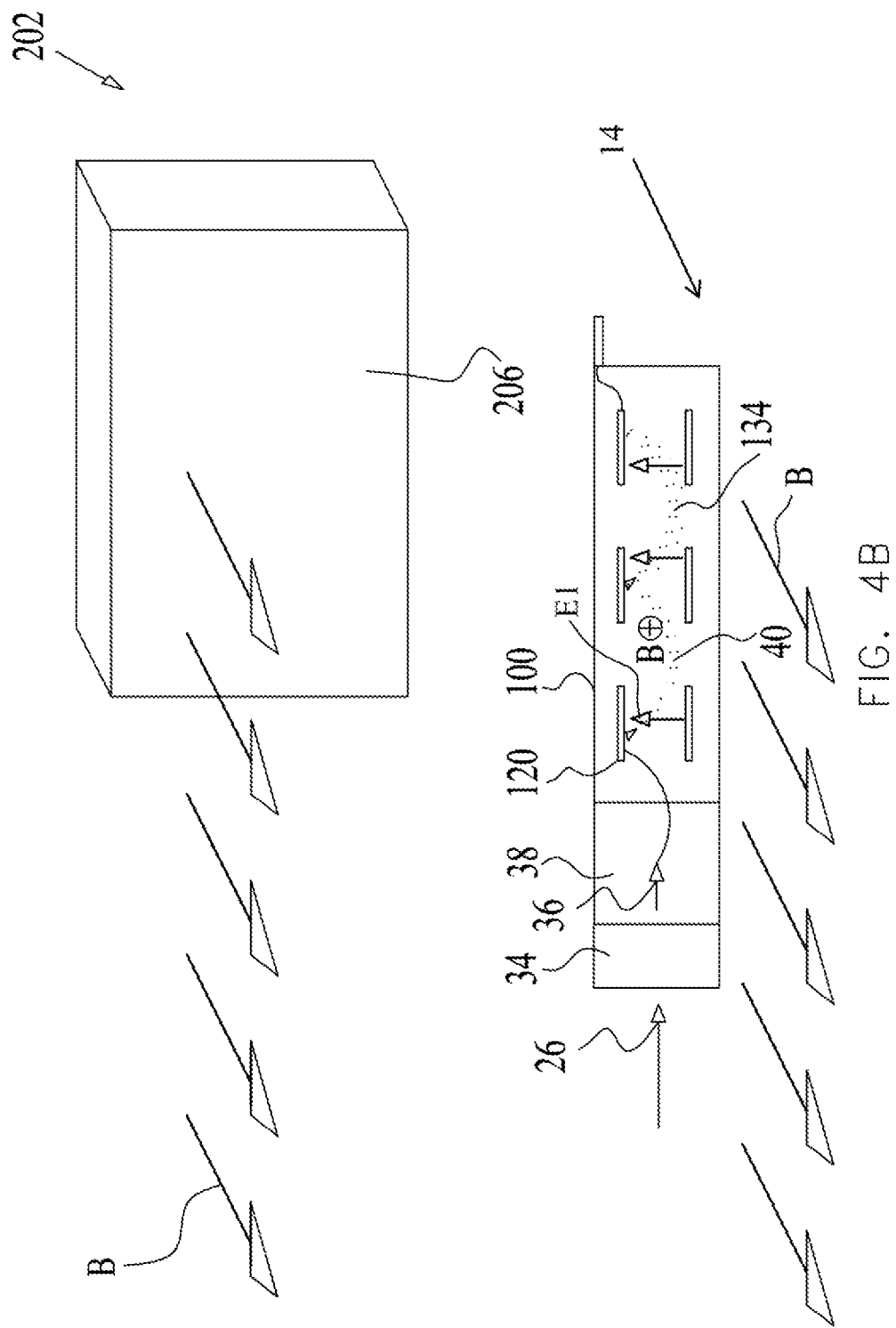

MAGNETIC PHOTOMULTIPLIER TUBE SYSTEM

CROSS-REFERENCE TO RELATED APPLICATIONS

This Application claims priority benefit from U.S. Provisional Application No. 62/806,838, filed Feb. 17, 2019 entitled: "Magnetic Photomultiplier Tube", the disclosure of which is incorporated herein by reference in its entirety.

TECHNICAL FIELD

This invention relates generally to photomultiplier tubes (PMT) and particularly to magnetic PMTs.

BACKGROUND

Conventional PMTs operate using their inner electric field and are generally shielded from external magnetic fields.

The conventional PMT is formed with an evacuated tube comprising a series of dynodes to enable electrons to advance within an electric field, from a photocathode through consecutive dynodes and finally to an anode while being multiplied by a secondary emission process. In the secondary emission process a single electron impinges upon a dynode to induce emission of a plurality of secondary electrons from the dynode.

Angular and energy distribution of electrons emitted from the dynodes lead to a transit time spread that, in turn, leads to smearing of an output pulse. The fastest conventional PMTs have a pulse width of about ~1.2 ns (measured at Full-Width Half-Maximum (FWHM) of the pulse) that confines their use in fields that require sub nanosecond time resolution, such as in Time-of-Flight Mass-Spectroscopy (TOF-MS).

The transit time can be defined as the interval between the arrival of a light pulse at the photocathode and that of the corresponding current pulse at the anode.

Use of conventional PMTs together with Magnetic Time-of-Flight (MTOF) detectors typically requires the shielding of the PMT from the magnetic field of MTOF ion detectors used in a TOF-MS instrument so as to ensure the magnetic field does not interfere with the electronic field within the PMT.

SUMMARY

One embodiment of the disclosure is the exploitation of an existing magnetic field of a MTOF ion detector or any other ion or particle detection system, for placing the PMT within a magnetic field, such that the PMT is unshielded from the magnetic field and thereby creating a magnetic PMT system. The magnetic field, B, is configured to form a cross E×B field with an electric field, E, so as to direct photoelectrons from a photocathode to an adjacent dynode and progress to an anode of the PMT.

Another embodiment of the disclosure is the arrangement of the dynodes. In some embodiments of the present disclosure, the dynodes in a magnetic PMT system are arranged with oppositely facing pairs of dynodes, spaced apart from an adjacent pair of oppositely facing dynodes. A potential difference between opposite dynodes, V1 produces a first electric field (annotated as E1 in FIG. 1), which forms the cross E1×B field with the magnetic field B. The potential difference between the adjacent dynodes, V2 (FIG. 2A), provides the energy needed for secondary emission multiplication.

The crossed electric and magnetic fields, E1×B, provides very uniform transit time of electrons between adjacent dynodes. This results in significant improvement of the transit time spread.

According to some embodiments of the present disclosure there is provided a magnetic photomultiplier tube (PMT) system, comprising a PMT. The PMT comprises a photocathode for converting an impinging photon to a photoelectron, an anode, and at least two or a series of oppositely facing pairs of dynodes, wherein each pair is spaced apart from an adjacent pair, a first electric field being generated intermediate at least one pair of oppositely facing dynodes and a second electric field generated intermediate at least one adjacent pairs of dynodes. The magnetic PMT system comprises a magnetic field generated by a magnetic system, the PMT is positioned within the magnetic field.

In some embodiments, the photoelectron emitted from the photocathode further impinges upon a dynode of one of the dynode pairs thereby generating secondary electrons and wherein the second electric field is configured for allowing further multiplication of the secondary electrons.

In some embodiments, a force produced by the cross product of the first electric field and the magnetic field is configured for propelling the secondary electrons along the PMT from the photocathode to the anode. In some embodiments, the series of dynodes are arranged longitudinally along the PMT.

In some embodiments, the series of dynodes are arranged about a curve. In some embodiments, the magnetic field is generated by a permanent magnet or an electromagnet. In some embodiments, a surface of the dynode is substantially flat.

In some embodiments, the pair of dynodes comprise a lower voltage biased dynode and a higher voltage biased dynode, the lower voltage biased dynode is positioned facing and aligned with the higher voltage biased dynode. In some embodiments, the pair of dynodes comprise a lower voltage biased dynode and a higher voltage biased dynode, wherein the lower voltage biased dynode is positioned staggeringly in respect to the higher voltage biased dynode.

In some embodiments, a force produced by the crossed first electric field and magnetic field improves uniform transit time of the secondary electrons between the adjacent dynodes. In some embodiments, the magnetic system is used by a particle detector system comprising the magnetic field and the magnetic PMT system is positioned unshielded in the magnetic field of the particle detection system. In some embodiments, the magnetic system is exclusively used by the magnetic PMT system.

In some embodiments, the photon is introduced into the magnetic PMT system via a light guide coupled to a scintillator. In some embodiments, the multiplied secondary electrons reach the anode of the magnetic PMT and form an output signal for analysis thereof by an analyzer.

According to some embodiments of the present disclosure there is provided an ion detection system comprising a converter configured for converting ions impinging thereon to electrons, a front plate for creating a preliminary electric field intermediate the converter and the front grid, a magnetic system for generating a magnetic field, the preliminary electric and magnetic fields are positioned normally to each other, a scintillator configured for converting the electrons impinging thereon to photons, a light guide for guiding the photons exiting the scintillator to a magnetic photomultiplier tube (PMT) system, the magnetic PMT system being positioned within the magnetic field and comprising a photocathode for converting an impinging photon to a photoelectron, a dynode configured to generate secondary electrons upon impingement of the photoelectron thereon, and at least two or a series of oppositely facing pairs of dynodes, wherein each pair is spaced apart from an adjacent pair, wherein a first electric field is generated in between the pair of oppositely facing dynodes, the orientation of the first electric field being normal to the orientation of the magnetic field, for facilitating the secondary electron transfer to the next adjacent pair of dynodes.

In some embodiments, a second electric field is generated intermediate adjacent dynode pairs for further multiplying the secondary electrons. In some embodiments, the secondary electron trajectory is generally curved intermediate the pairs of adjacent dynode. In some embodiments, the magnetic system comprises a permanent magnet or an electromagnet.

According to some embodiments of the present disclosure there is provided a particle detection system comprising an optional conversion system for converting the particle to a photon, and a magnetic PMT system comprising a photocathode for converting an impinging photon to a photoelectron, an anode, and a series of dynodes comprising at least two or a series of oppositely facing pairs of dynodes, wherein each pair is spaced apart from an adjacent pair, a first electric field being generated intermediate each pair of oppositely facing dynodes and a second electric field generated intermediate adjacent pairs of dynodes, and a magnetic field generated by a magnetic system, the PMT being positioned within the magnetic field.

In some embodiments, the particle detection system further comprises an additional magnetic system for generating a magnetic field configured to affect the conversion system.

BRIEF DESCRIPTION OF THE DRAWINGS

FIGS. 4A and 4B are each a simplified illustration of a particle detection system, constructed and operative according to an embodiment of the present disclosure;

DETAILED DESCRIPTION OF EMBODIMENTS

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

In accordance with an embodiment of the disclosure there is provided a particle detection system for detecting a particle. The particle may comprise any one or more of: an ion, positively or negatively charged, and/or neutral particles as well as electrons and/or photons. By way of a non-limiting example, some embodiments will describe an ion detection system, it being appreciated that the particle detection system can detect any of the above particles, mutatis mutandis.

Figure 1:
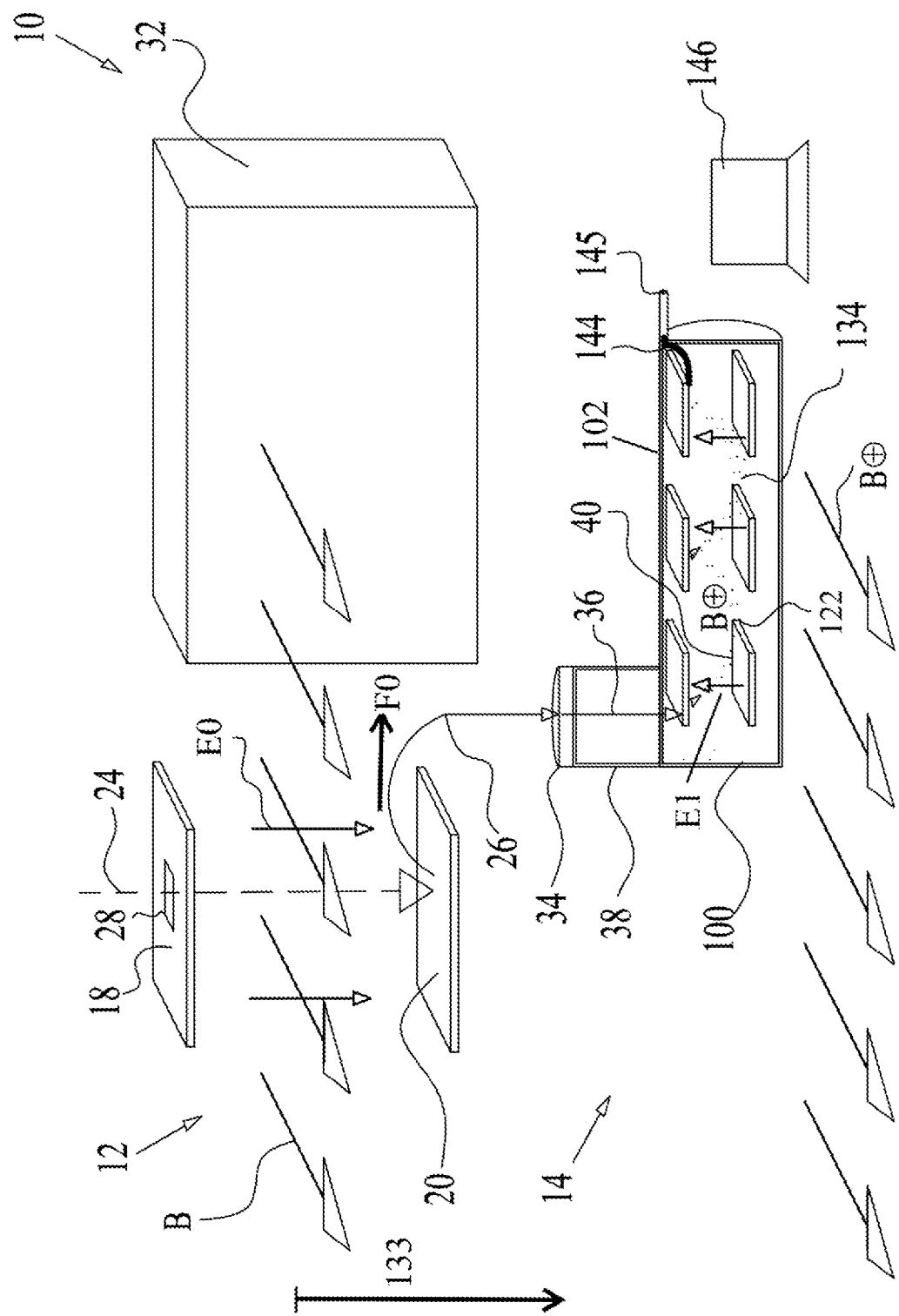
FIG. 1 is a simplified illustration of a particle detection system, constructed and operative according to an embodiment of the present disclosure.

As seen in FIG. 1, a particle detection system 10 may comprise an MTOF assembly 12 and a magnetic PMT system 14. The particle detection system 10 may be placed in an evacuated chamber (e.g. chamber 300 of FIG. 7).

In an exemplary embodiment of FIG. 1, the particle detection system 10 may comprise an ion detection system. The MTOF assembly 12 includes a front plate 18 and a converter, such as a converter plate 20 configured for converting ions 24, (in a non-limiting example positive ions) impinging thereon, to secondary electrons 26. The front plate 18 may comprise a grid, mesh, a slit or any other type of aperture 28 of any appropriate size to allow the ion 24 therethrough to the converter plate 20. The front plate 18 and the converter plate 20 are generally positioned parallel to each other and create an electric field E0 therebetween. For clarity, this electric field E0 will be referred to as the preliminary electric field E0.

Figure 2A:
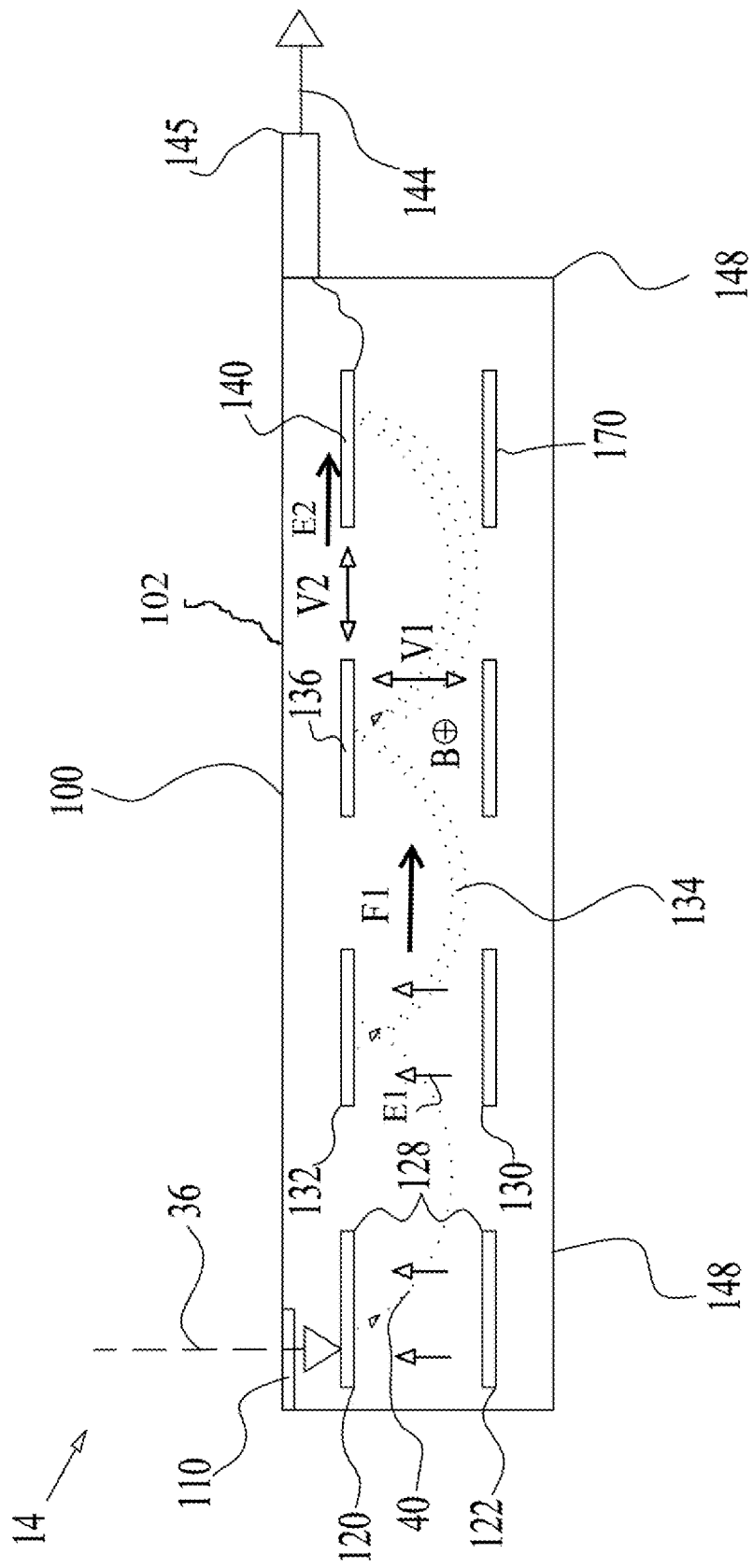
FIGS. 2A and 2B are a simplified front view and top view illustration of a particle detection system, respectively, constructed and operative according to an embodiment of the present disclosure.
Figure 2B:
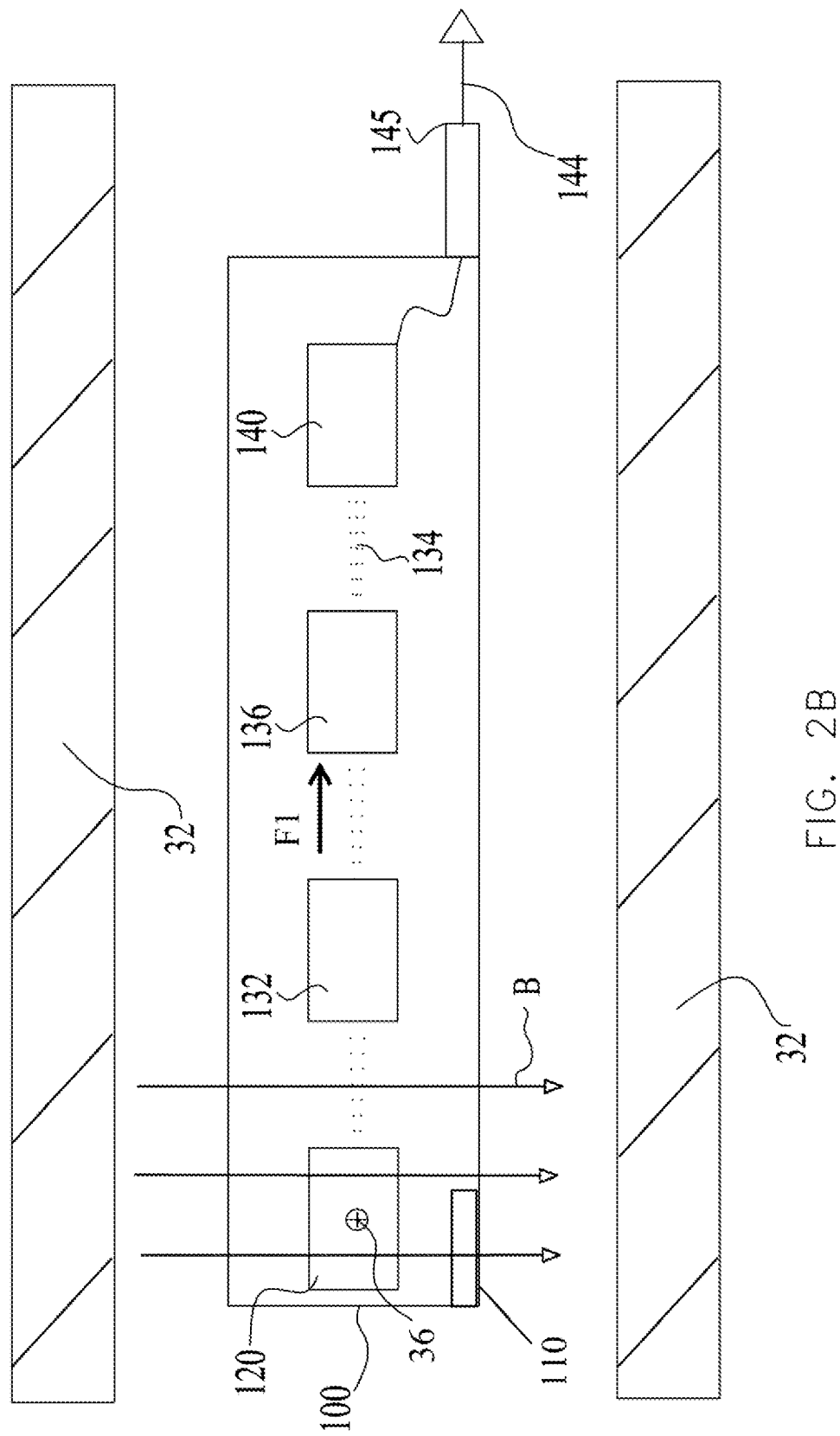

A magnetic system 32 comprising a single or plurality of permanent magnets or electromagnets is configured to generate a magnetic field, B, such as a homogeneous or non-homogeneous magnetic field. In some embodiments, as shown in FIG. 2B, the magnetic system 32 comprises two oppositely facing permanent magnets, it being appreciated that any suitable means for generating a magnetic field may be provided.

The magnetic field, B, and the preliminary electric field E0 are positioned normally (namely orthogonally) to each other, thereby creating a preliminary crossed E0×B field for propelling the secondary electrons 26 away from the converter 20 towards a scintillator 34. The scintillator 34 is configured for converting the secondary electron 26 impinging thereon to photons 36. A light guide 38 guides the photons 36 produced by the scintillator 34 to the magnetic PMT system 14 where the photons 36 are converted to photoelectrons 40 that are multiplied, thereby yielding an amplified signal. In a non-limiting example, the MTOF assembly 12 may comprise an MTOF detector described in U.S. Pat. No. 7,180,060, incorporated in its entirety herein.

The orientation of the force produced by the preliminary crossed E0×B field depends on the orientation of the preliminary electric field E0 and the magnetic field, B as well as the charge (positive or negative) of the particle. In the example of FIG. 1 the preliminary crossed E0×B field produces a lateral force F0. The secondary electron 26 is propelled by this lateral force F0 to the positively biased scintillator 34 (e.g. which scintillator 34 is biased in the range of about 6 to 12 KV).

The trajectory of the secondary electron 26 from the converter plate 20 to the scintillator 34 is subjected to the lateral force F0 and the positively biased scintillator 34. The trajectory of the secondary electron 26 may be any suitable shape, generally curved and with any portion of an arc, such as a turn of 90-300 degrees, subranges and values thereof. In a non-limiting example the trajectory may define a turn of 180 degrees or 270 degrees.

The magnetic PMT system 14 comprises a PMT 100 comprising a housing 102 placed unshielded (namely exposed without a barrier) in the magnetic field, B, thereby subjecting the PMT 100 to the magnetic forces of the magnetic field, B.

As seen in FIGS. 2A to 3C, the photon 36 enters the PMT 100 at a window 110 or via any other suitable means, and impinges upon a photocathode 120 so as to be converted to the photoelectron 40. The photocathode 120 is a dynode and is paired with an oppositely facing dynode 122 forming a pair of dynodes 128.

The PMT 100 may comprise a single pair or at least two or a series of dynode pairs 128. The series of dynodes may comprise oppositely facing pairs of dynodes 128, spaced apart from an adjacent pair of oppositely facing dynodes 128. Substantially, each pair of dynodes 128 are arranged with a potential V1 therebetween. The potential difference V1 generates a first electric field, E1, intermediate a lower voltage biased dynode 132 and a higher voltage biased dynode 130. A potential of V2 is set between adjacent pairs of dynodes 128 for generating a second electric field E2. The preliminary electric field E0 and first electric field E1 may be positioned generally parallel to an axis 133 (FIG. 1) while second electric field E2 generated by V2, may be positioned generally perpendicularly to axis 133.

A first force F1 produced by the product of the first crossed E1×B field of the magnetic PMT 100 propels the photoelectron 40 to an adjacent dynode 132, thereby emitting multiple secondary electrons 134 at an energy level of V2. The secondary electrons 134 are further propelled by the force of the F1 to an adjacent dynode 136 of adjacent pairs 128 at the energy level of V2 for further multiplication of the secondary electrons 134. As seen in the embodiment of FIG. 2A, the orientation of force F1 is generally perpendicular (i.e. orthogonal) to the orientation of first electric field E1 and is generally perpendicular (i.e. orthogonal) to the orientation of magnetic field B.

The dynode series may comprise at least two or many more pairs of dynodes 128. In a non-limiting example there are 8-12 pairs. In a non-limiting example there are 2-40 pairs, subranges and values thereof. As seen in FIG. 2A, the secondary electron trajectory is generally curved intermediate the pairs of adjacent dynodes 128.

In a non-limiting example, V1 has a voltage of about 500V. In a non-limiting example, V1 has a voltage in the range of about 100V-6000V and subranges and values thereof. In a non-limiting example, V2 has a voltage of about 100V. In a non-limiting example, V2 has a voltage in the range of about 20V-800V and subranges and values thereof. In a non limiting example the strength of the magnetic field B (or B1 as described in FIG. 5) can be in the range of about 100-500 Gauss, subranges and values thereof.

The force F1, provides a very uniform transit time of the secondary electrons between the adjacent dynodes, thereby minimizing the transit time spread.

In a non-limiting example, in a standard PMT the non-uniformity in transit time (i.e. the transit time spread) leads to a single photon pulse FWHM ~1.2 or more nanoseconds, while in the Magnetic PMT system 14 it is found to be about ~0.4-0.5 nanoseconds.

The multiplied secondary electrons 134 reach an anode 140 which forms an output signal 144, communicated via a wire to an output (e.g. pin, coax and the like) 145 for analysis thereof by an analyzer 146 (FIG. 1).

In some exemplary embodiments, the PMT 100 may comprise a single dynode 122 or a single pair of dynodes (i.e. replacing the series of pairs of dynodes 128), such as a dynode positioned in the place of the lower voltage biased dynode 132 and/or a dynode positioned in the place of the a higher voltage biased dynode 130.

The dynodes may be arranged in any suitable arrangement. As seen in FIG. 2A, the dynodes are arranged longitudinally along the magnetic PMT 100.

Figure 3A:
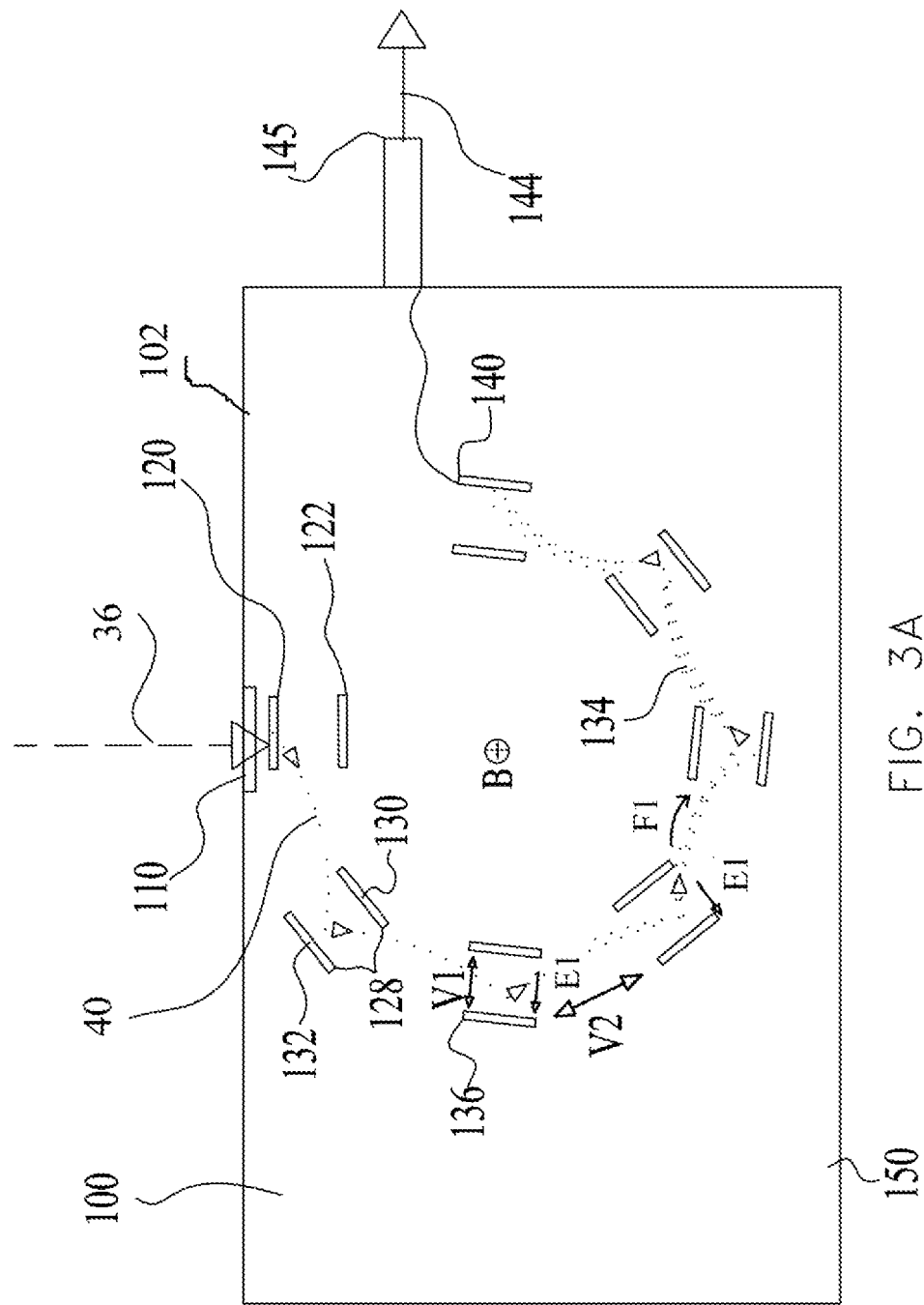
FIGS. 3A-3C are each a simplified illustration of a particle detection system, constructed and operative according to an embodiment of the present disclosure.

As seen in FIG. 3A, the series of adjacently positioned pairs of oppositely facing dynodes 128 may be arranged about a curve such as about a portion of a circle. A photon 36 enters the magnetic PMT 100 at the window 110 and impinges upon the photocathode 120. Somewhat similar to FIG. 2A, the pairs of dynodes 128 are arranged with the potential V1 therebetween generating the first electric field, E1.

The force F1, produced by the crossed first electric field E1 and the magnetic field B, directs the photoelectron 40, and in turn the secondary electrons 134, to propel along the PMT 100 from the photocathode 120 to the anode 140 and intermediate dynode pairs 128. The potential of V2 is set between adjacent pairs of dynodes 128 to provide the energy V2 for secondary electrons 134 to impinge upon the adjacent dynode 136 which in turn emits multiplied secondary electrons 134 therefrom.

As seen in FIG. 3A, the secondary electron trajectory is generally curved intermediate the pairs of adjacent dynodes 128 since the force F1 is curved as well.

It is appreciated that other dynode arrangements are possible, such as spiral, rectangular and the like.

The PMT 100 may be formed of any suitable volume for housing a plurality of dynodes therein. As seen in FIGS. 2A the volume comprises an elongated tube/cylinder/parallelepiped 148, i.e. where the horizontal axis is longer than the vertical axis. In FIG. 3A the volume comprises a shortened tube/cylinder/parallelepiped 150, i.e. where the longitudinal axis is shorter than the diameter or equal thereto or any other suitable volume, such as a box/parallelepiped, for example. The window 110 may be positioned at any suitable location along the PMT housing 102 for allowing the photon 36 to enter the volume of the PMT housing 102 and reach the photocathode 120.

In accordance with an embodiment of the present disclosure, the magnetic PMT 100 is placed, unshielded, in the magnetic field, B.

The multiplied secondary electrons 134 reach the anode 140 of the magnetic PMT 100 and form the output signal 144 for analysis thereof by the analyzer 146 (FIG. 1).

Figure 3B:
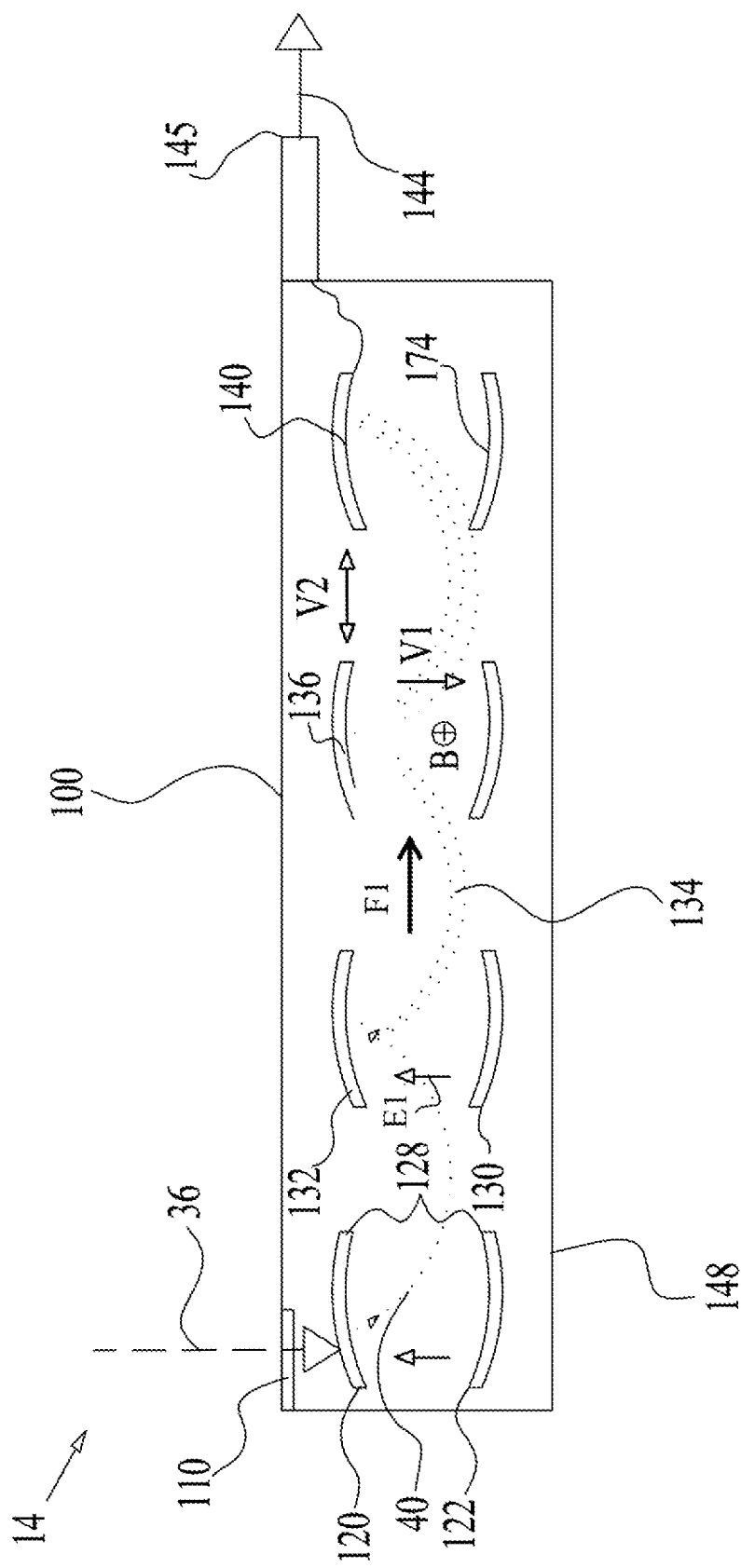

It is appreciated that the dynodes 122 may be formed in any suitable configuration. In the embodiment of FIG. 2A the dynodes 122 are shown to be formed with a substantially flat surface 170. As seen in FIG. 3B the dynodes are formed with a curved surface 174. The curvature shape (e.g. the curvature radius) is determined to ensure the photoelectrons 40, and in turn the secondary electrons 134, propagate along the pairs of dynodes 128 within the PMT 100 while impinging upon the dynodes 122 to multiply the secondary electrons 134 and keeping minimum transit time spread.

Figure 3C:
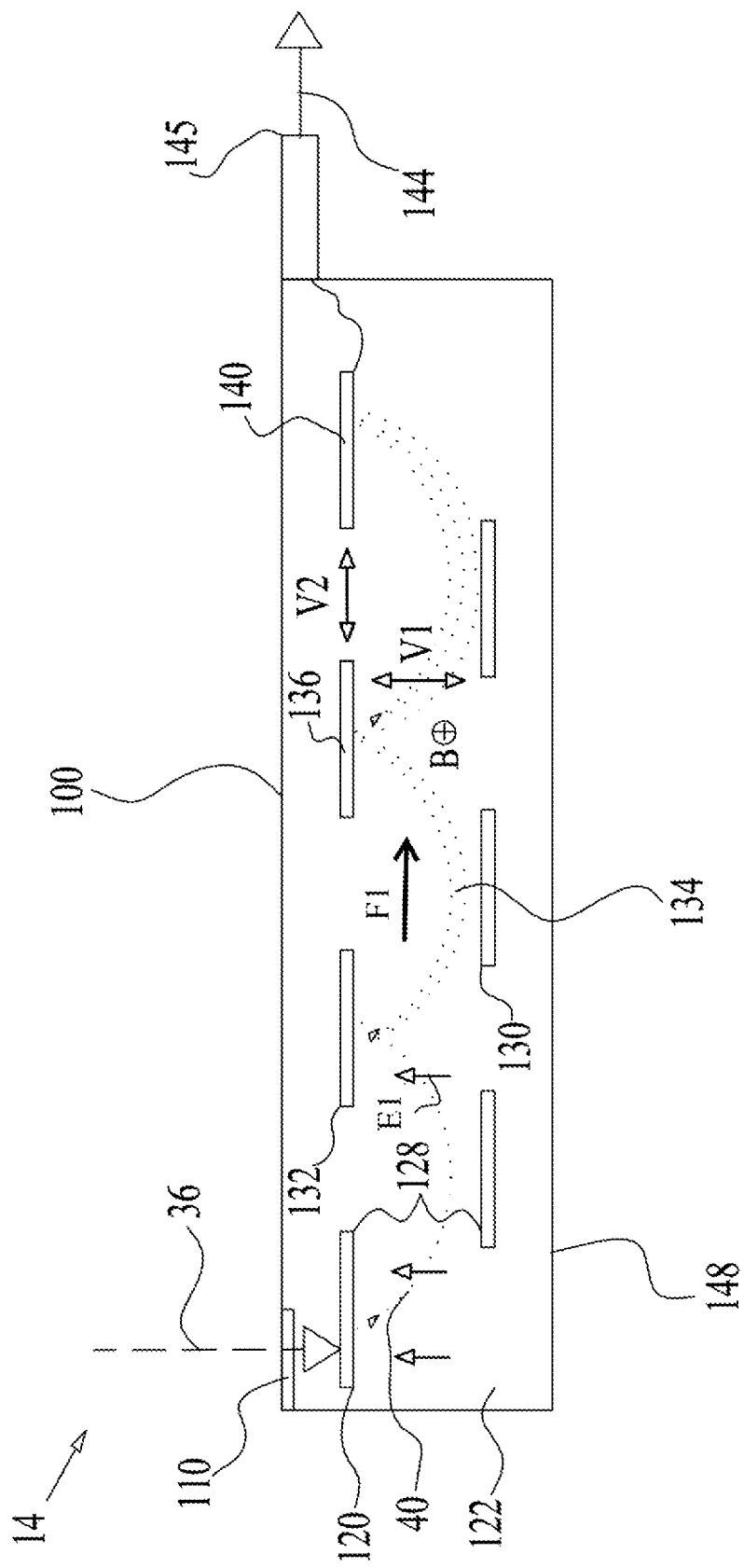

The dynodes 122 may be arranged within the PMT 100 in any suitable arrangement. In the embodiment of FIG. 2A the dynodes 122 are shown to be arranged with oppositely facing, generally aligned, dynode pairs 128. In FIG. 3C the dynodes 122 are staggeringly arranged in respect to an oppositely facing dynode.

It is appreciated that in some embodiments the dynodes may be both curved as in FIG. 3A while being staggeringly arranged, as shown in FIG. 3C.

Figure 5:
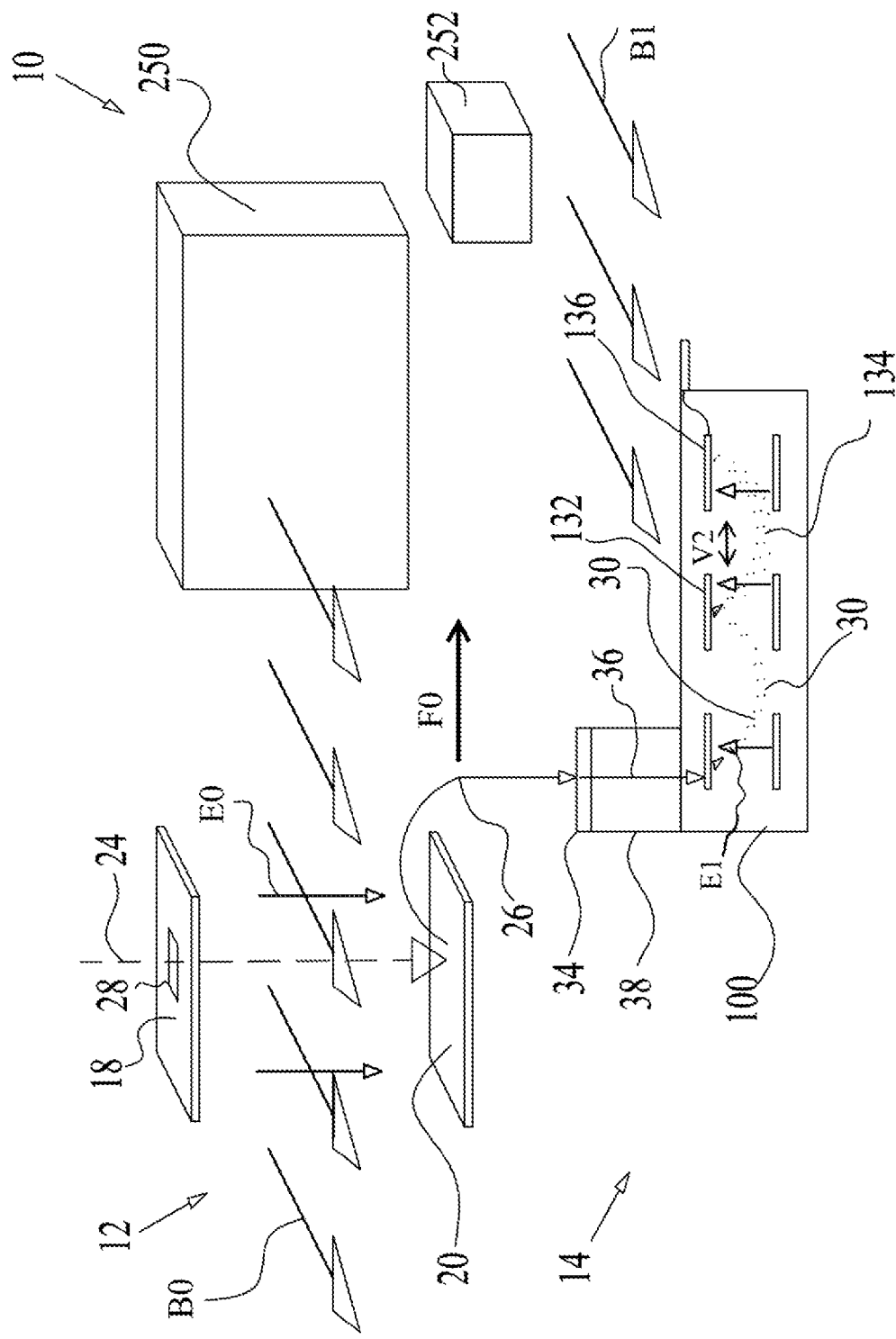
FIG. 5 is a simplified illustration of a particle detection system, constructed and operative according to an embodiment of the present disclosure.
Figure 6:
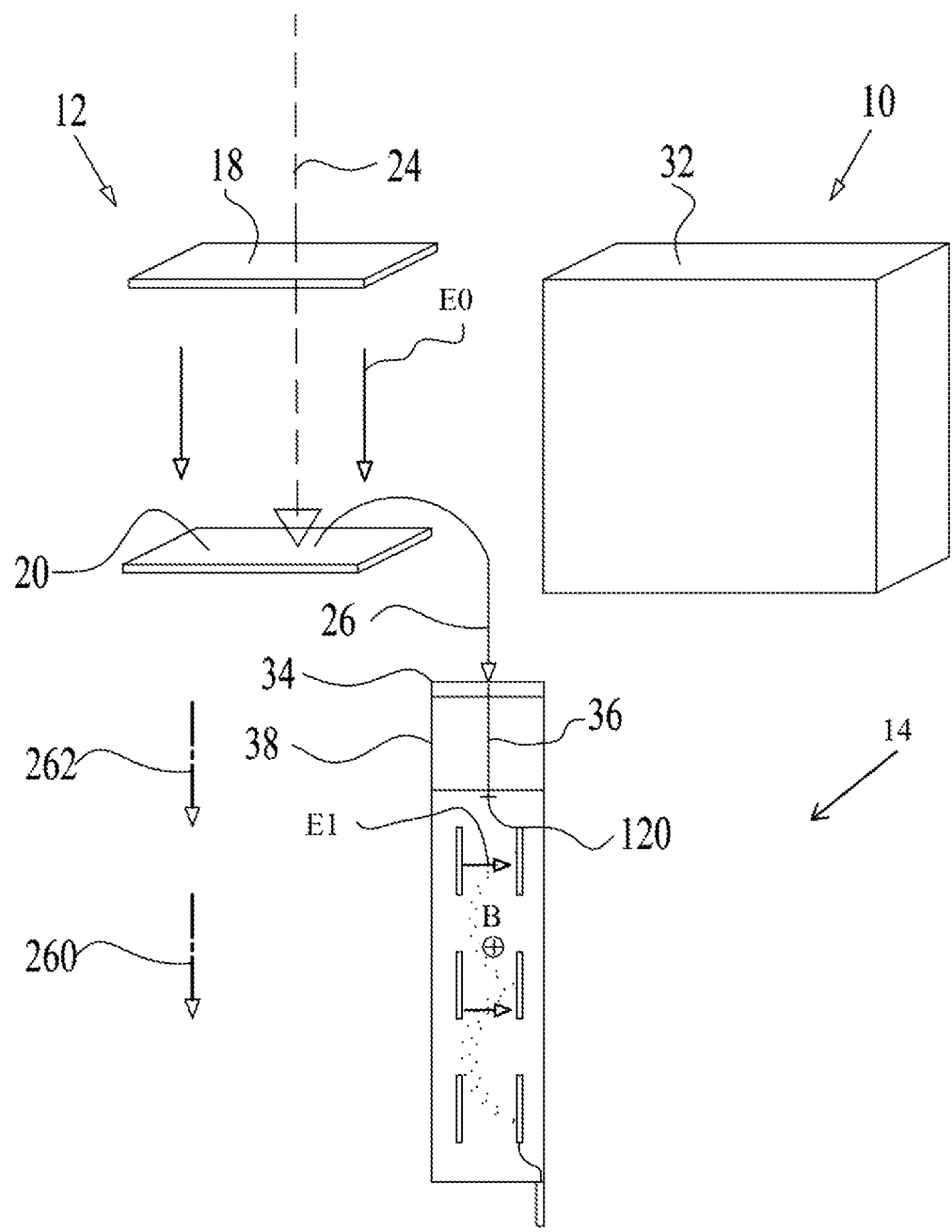
FIG. 6 is a simplified illustration of a particle detection system, constructed and operative according to an embodiment of the present disclosure.

It is noted that in FIG. 1 the particle detection system 10 comprises the MTOF assembly 12 and the magnetic PMT system 14 wherein the magnetic force B is generated by a common, shared magnet system 32. In some embodiments, the particle detection system 10 may exclude the MTOF assembly 12 and comprise the magnetic PMT system 14, as shown for example in FIGS. 4A and 4B. In some embodiments, the particle detection system 10 may comprise the MTOF assembly 12 with its own magnet system 250 and the magnetic PMT system 14 with its own magnet system 252, as shown in FIG. 5.

In FIGS. 4A and 4B the MTOF assembly 12 does not appear and may be replaced by any other suitable system or may be obviated.

In FIG. 4A, the particle detection system 10 may comprise in a non-limiting example a photon detection system 200 for detecting a photon 36. The photon 36 enters the magnetic PMT system 14 which includes the magnet system 32 comprising a single or plurality of permanent magnets or electromagnets for generating the magnetic field, B. The photon 36 enters the magnetic PMT system 14 (which may be designed in any suitable embodiments such as shown in FIGS. 1-7) where the photons 36 are converted by photocathode 120 to photoelectrons 40. The dynode pairs 128 in turn convert the photoelectrons 40 to secondary electrons 134, which are multiplied, thereby yielding an augmented signal. As described above, the crossed electric and magnetic fields, E×B (or as specifically annotated in FIGS. 1-3C: first E1×B field), provide for highly improved uniform transit time of the secondary electrons 134 between the adjacent dynodes, thereby minimizing the transit time spread. In other words, the magnetic field B provides for minimizing dispersion of the electron transit time at their motion along the series of dynodes.

In FIG. 4B, the particle detection system 10 may comprise in a non-limiting example an electron detection system 202 for detecting an electron 26. The electron detection system 202 comprises the scintillator 34 which converts the electron 26 impinging thereon to photons 36. The light guide 38 guides the photons 36 to the magnetic PMT system 14 which operates generally as described in reference to FIG. 4A.

In some embodiments, the particle detection system 10 comprises the magnetic PMT system 14 and an optional conversion system for converting the particle to a photon 36 prior to entering the PMT system 14. The conversion system may comprise the converter plate 20 for converting a positively or negatively charged ion, alternatively or additionally the conversion system may comprise the scintillator 34 which is configured to convert an electron or ion impinging thereon to photons. The light guide 38 guides the photons 36 to the magnetic PMT system 14. The conversion system may comprise any other suitable means for converting a particle to a photon.

As seen in FIG. 5, the particle detection system 10 comprises the MTOF assembly 12 with its own magnet system, here shown as magnet system 250, which generates a preliminary magnetic field B0. The preliminary magnetic field B0, and the preliminary electric field E0 are positioned normally to each other, thereby creating the preliminary crossed E0×B0 field generating the force F0 for propelling the secondary electrons 26 away from the converter 20 towards the scintillator 34. The magnetic PMT system 14 with its own magnet system (which may or may not be exclusively used by the magnetic PMT system 14), here shown as magnet system 252, generates a first magnetic field B1 (which is the same magnetic field B described in reference to FIGS. 1-4B). The force F1 produced by the product of the first crossed E1×B1 field of the magnetic PMT 100 propels the photoelectron 40 to an adjacent dynode 132, thereby emitting multiple secondary electrons 134 at the energy level of V2. As described hereinbefore, the secondary electrons 134 are further propelled by the force E1×B1 field, namely by produced force F1, to an adjacent dynode 136 of adjacent pairs 128 at the energy level of V2 for generating a potential difference between adjacent dynode pairs 128 for further multiplication of the secondary electrons 134.

It is appreciated that the magnetic PMT system 14 may be positioned in any suitable manner, generally in an orientation which is suitable for fitting in the typically crowded evacuated chamber housing the magnetic PMT system 14. As seen for example in FIG. 6, the magnetic PMT system 14 may be positioned at the same longitudinal axis 260 relative to the longitudinal axis 262 of scintillator 34 and/or light guide 38. In FIG. 1 the magnetic PMT system 14 is shown positioned perpendicularly relative to scintillator 34 and/or light guide 38, i.e. perpendicularly relative to axis 133 (it is noted that axis 133 is parallel to the longitudinal axis 260 and axis 262). In some embodiments, the magnetic PMT system 14 may be positioned at an angle relative to the longitudinal axis 262 of scintillator 34 and/or light guide 38.

Figure 7:
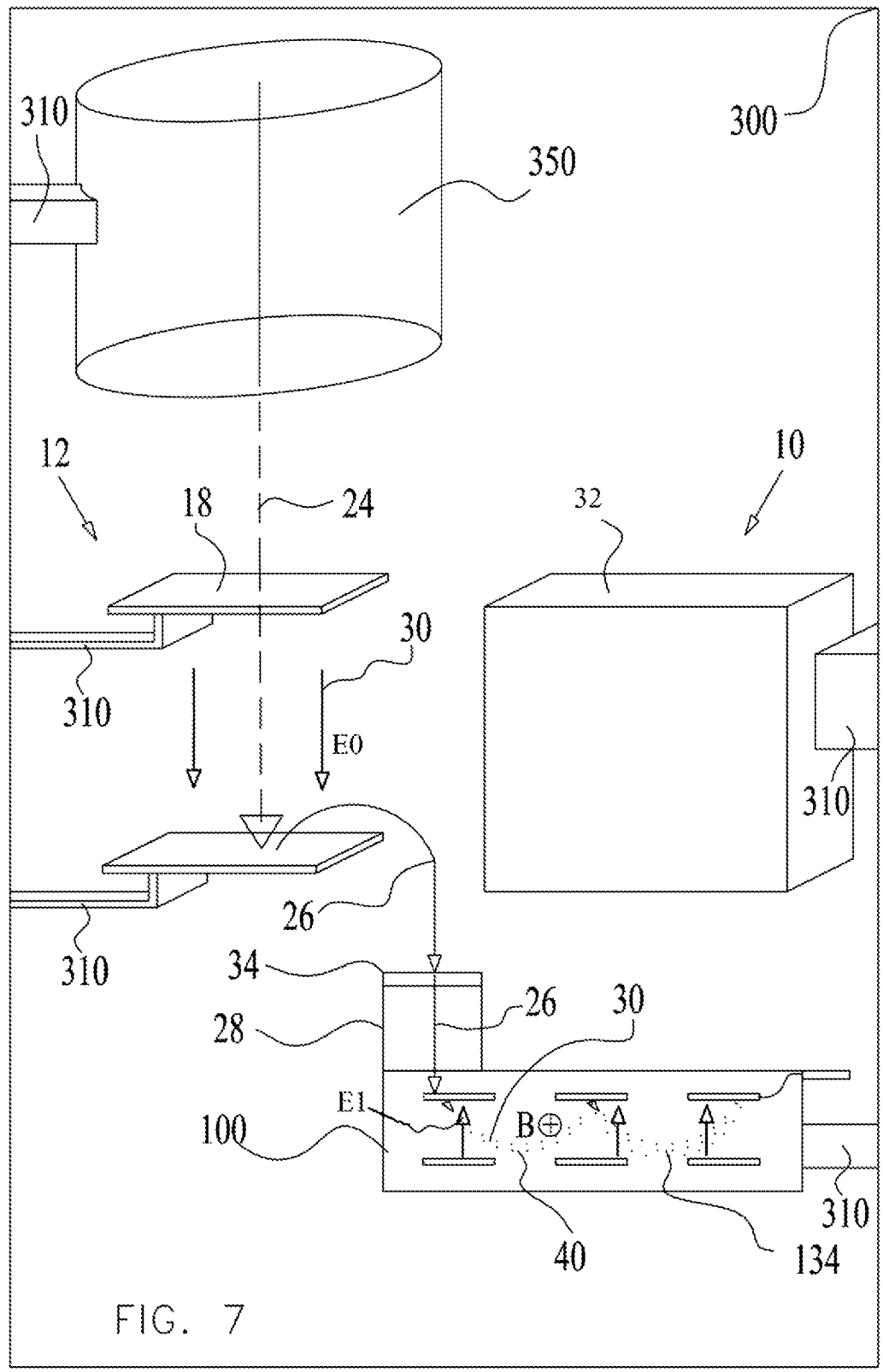
FIG. 7 is a simplified illustration of a particle detection system, constructed and operative according to an embodiment of the present disclosure.

As seen in FIG. 7, the particle detection system 10 is placed within an evacuated chamber 300. The components (e.g. the PMT 100, the magnet system 32 etc.) of the particle detection system 10 may be anchored within the chamber 300 in any suitable manner, such as via clamps or any other positioning elements 310. The components may be arranged with the chamber 300 in any suitable arrangement. In FIG. 7 the exemplary particle detection system 10 comprises a Time of Flight (TOF) system 350 which emits a particle 24 (e.g. an ion) therefrom to the front plate 18.

It is noted that the magnetic PMT system 14 described in the present disclosure may be utilized in any particle detection system or equivalent thereof.

While various inventive embodiments have been described and illustrated herein, those of ordinary skill in the art will readily envision a variety of other means, materials, or structure for performing the function, obtaining the results, or one or more of the advantages described herein, and each of such variations or modifications is deemed to be within the scope of the inventive embodiments described herein. More generally, those skilled in the art will readily appreciate that all parameters, dimensions, materials, and configurations described herein are meant to be for example only and that the actual parameters, dimensions, materials, and configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims, equivalents thereto, and any claims supported by the present disclosure, inventive embodiments may be practiced otherwise than as specifically described and claimed. Inventive embodiments of the present disclosure are directed to each individual feature, system, article, material, composition, kit, method, and step, described herein. In addition, any combination of two or more such features, systems, articles, materials, compositions, kits, methods, and steps, if such features, systems, articles, materials, compositions, kits, methods, and steps, are not mutually inconsistent, is included within the inventive scope of the present disclosure. Embodiments disclosed herein may also be combined with one or more features, functionality, or materials, as well as complete systems, devices or methods, to yield yet other embodiments and inventions. Moreover, some embodiments, may be distinguishable from the prior art by specifically lacking one and/or another feature disclosed in the particular prior art reference(s); i.e., claims to some embodiments may be distinguishable from the prior art by including one or more negative limitations.

Also, as noted, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A magnetic photomultiplier tube (PMT) system, comprising:
   a PMT comprising:
      a photocathode for converting an impinging photon to a photoelectron;
      an anode; and
      at least two or a series of oppositely facing pairs of dynodes, wherein each pair is spaced apart from an adjacent pair,
      a first electric field being generated intermediate at least one pair of oppositely facing dynodes and a second electric field generated intermediate at least one adjacent pairs of dynodes; and
   a magnetic field generated by a magnetic system, the PMT being positioned within the magnetic field.

2. A magnetic PMT system according to claim 1, wherein the photoelectron emitted from the photocathode further impinges upon a dynode thereby generating secondary electrons and wherein the second electric field is configured for allowing further multiplication of the secondary electrons.

3. A magnetic PMT system according to claim 2, wherein a force produced by a cross product of the first electric field and the magnetic field is configured for propelling the secondary electrons along the PMT from the photocathode to the anode.

4. A magnetic PMT system according to claim 1, wherein the series of oppositely facing pairs of dynodes are arranged longitudinally along the PMT.

5. A magnetic PMT system according to claim 1, wherein the series of oppositely facing pairs of dynodes are arranged about a curve.

6. A magnetic PMT system according to claim 1, wherein the magnetic field is generated by a permanent magnet or an electromagnet.

7. A magnetic PMT system according to claim 1, wherein a surface of the dynode is substantially flat.

8. A magnetic PMT system according to claim 1, wherein the pair of dynodes comprise a lower voltage biased dynode and a higher voltage biased dynode, wherein the lower voltage biased dynode is positioned facing and aligned with the higher voltage biased dynode.

9. A magnetic PMT system according to claim 1, wherein the pair of dynodes comprise a lower voltage biased dynode and a higher voltage biased dynode, wherein the lower voltage biased dynode is positioned staggeringly in respect to the higher voltage biased dynode.

10. A magnetic PMT system according to claim 1, wherein a force produced by the crossed first electric field and magnetic field improves uniform transit time of the secondary electrons between the adjacent dynodes.

11. A magnetic PMT system according to claim 1, wherein the magnetic system is used by a particle detector system comprising the magnetic field and the magnetic PMT system is positioned unshielded in the magnetic field of the particle detection system.

12. A magnetic PMT system according to claim 1, wherein the magnetic system is exclusively used by the magnetic PMT system.

13. A magnetic PMT system according to claim 1, wherein the photon is introduced into the magnetic PMT system via a light guide coupled to a scintillator.

14. A magnetic PMT system according to claim 2, wherein the multiplied secondary electrons reach the anode of the magnetic PMT and form an output signal for analysis thereof by an analyzer.

15. An ion detection system comprising:
a converter configured for converting ions impinging thereon to electrons;
a front plate for creating a preliminary electric field intermediate the converter and the front grid;
a magnetic system for generating a magnetic field,
the preliminary electric and magnetic fields are positioned normally to each other;
a scintillator configured for converting the electrons impinging thereon to photons; and
a light guide for guiding the photons exiting the scintillator to a magnetic photomultiplier tube (PMT) system, the magnetic PMT system being positioned within the magnetic field and comprising:
a photocathode for converting an impinging photon to a photoelectron;
a dynode configured to generate secondary electrons upon impingement of the photoelectron thereon; and
at least two or a series of oppositely facing pairs of dynodes, wherein each pair is spaced apart from an adjacent pair,
wherein a first electric field is generated in between the pair of oppositely facing dynodes, the orientation of the first electric field being normal to the orientation of the magnetic field, for facilitating the secondary electron transfer to the next adjacent pair of dynodes.

16. An ion detection system according to claim 15, wherein a second electric field is generated intermediate adjacent dynode pairs and is configured for allowing further multiplication of the secondary electrons.

17. An ion detection system according to claim 15, wherein the secondary electron trajectory is generally curved intermediate the pairs of adjacent dynode.

18. An ion detection system according to claim 15, wherein the magnetic system comprises a permanent magnet or an electromagnet.

19. A particle detection system comprising:
an optional conversion system for converting the particle to a photon; and
a magnetic PMT system comprising:
a photocathode for converting an impinging photon to a photoelectron;
an anode; and
a series of dynodes comprising at least two or a series of oppositely facing pairs of dynodes, wherein each pair is spaced apart from an adjacent pair,
a first electric field being generated intermediate each pair of oppositely facing dynodes and a second electric field generated intermediate adjacent pairs of dynodes; and
a magnetic field generated by a magnetic system, the PMT being positioned within the magnetic field.

20. A particle detection system according to claim 19, further comprising an additional magnetic system for generating a magnetic field configured to affect the conversion system.

* * * * *